May 15, 1956 C. D. CUPP 2,745,612
STEERABLE, CASTERABLE AIRPLANE WHEEL MOUNTING
Filed July 19, 1954 3 Sheets-Sheet 1

INVENTOR.
Charles D. Cupp
BY
Walter H. Popp.
Attorney.

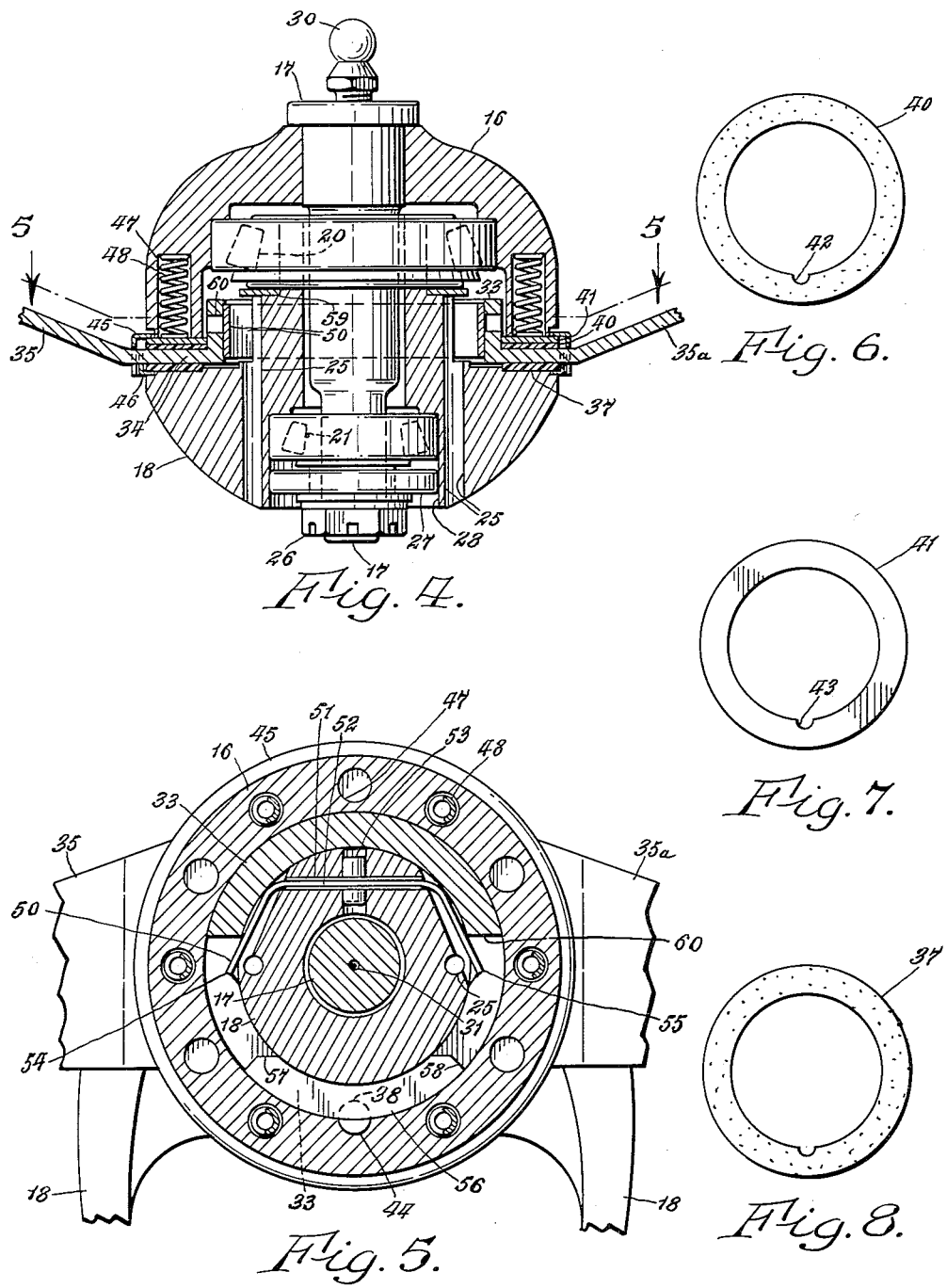

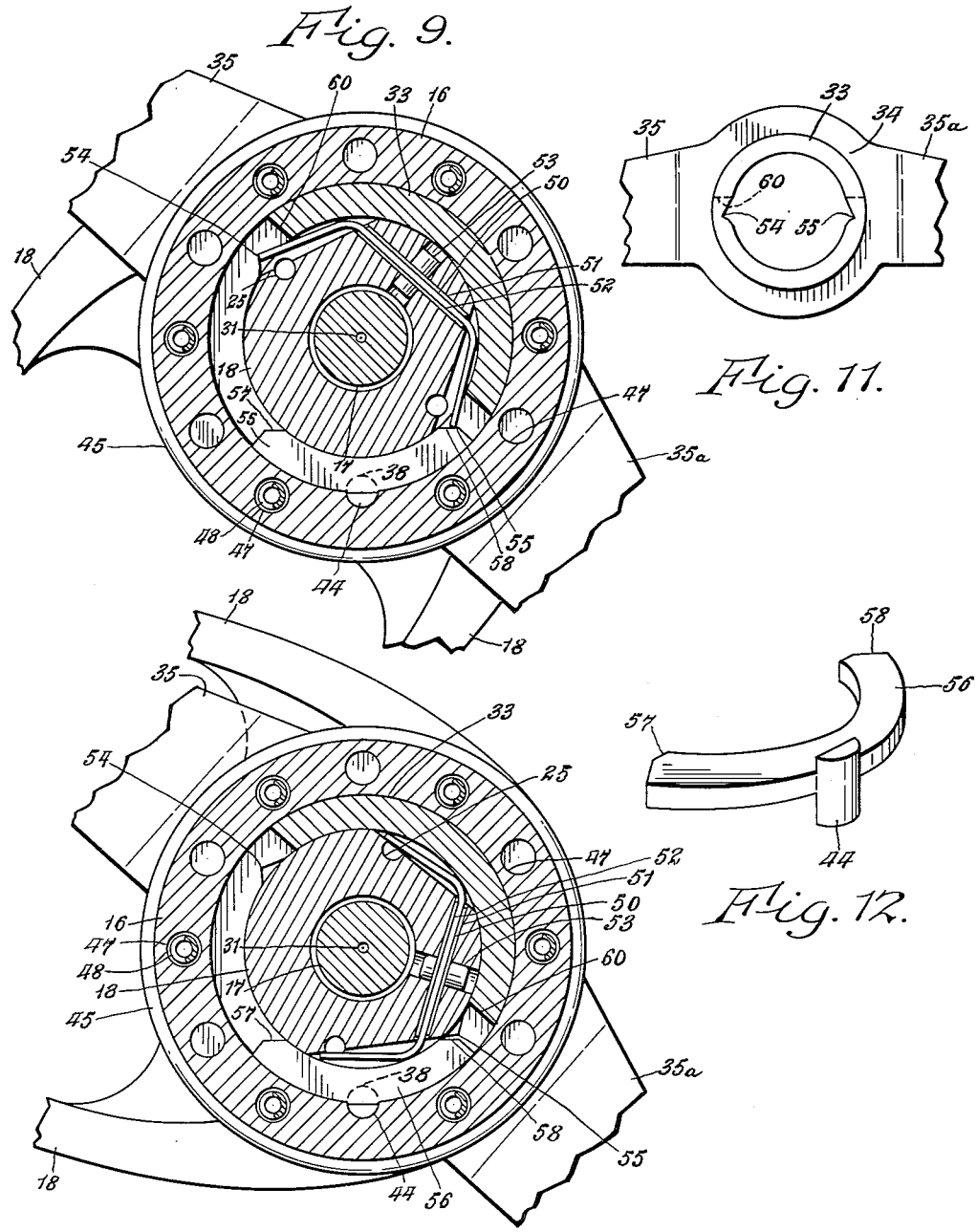

United States Patent Office 2,745,612
Patented May 15, 1956

2,745,612

STEERABLE, CASTERABLE AIRPLANE WHEEL MOUNTING

Charles D. Cupp, Lancaster, N. Y., assignor to Scott Aviation Corporation, Lancaster, N. Y.

Application July 19, 1954, Serial No. 444,000

5 Claims. (Cl. 244—50)

This invention relates to that type of airplane wheel mounting in which the wheel is steered by the pilot (either in the air or on the ground), within a certain limited range of action in direct coordination with the rudder of the airplane, but which is automatically uncoupled from said rudder and is enabled to caster freely whenever the airplane is pushed around manually in such a manner that the wheel is swung past its limited range of controlled action.

This invention is an improvement over the "Casterable Airplane Wheel" disclosed in U. S. Patent 2,614,775 issued October 21, 1952, to N. C. Koester et al.

The principal objects of the present invention are to provide such a steerable, casterable wheel mounting—

1. Which will provide the most efficient amount of anti-shimmy drag when the tendency of the wheel to shimmy is maximum, and with no increase in this amount of drag when the tendency to shimmy is less.

2. Which will enable the amount of this anti-shimmy drag to be conveniently adjusted either in the factory or in the field so as to counteract the shimmy characteristics of each individual airplane and of this airplane if and when its operating conditions are changed due to wear, etc.

3. Which can be manufactured at low cost with maximum production tolerances.

4. Which can be easily assembled and disassembled even as regards the parts which are press-fitted into place.

5. Which will operate effectively even after prolonged abuse and neglect.

Other objects of the invention and practical solutions thereof are shown in the following detailed description and in the accompanying drawings wherein:

Fig. 4 is a fragmentary, transverse, medial section through the wheel mounting taken on line 4—4 of Fig. 3.

Fig. 5 is a fragmentary, horizontal section through the wheel mounting taken on line 5—5 Fig. 4.

Fig. 6 is a top plan view of the upper, anti-shimmy, friction washer 40.

Fig. 7 is a top plan view of the metal, pressure-distribution washer 41 thereof.

Fig. 8 is a top plan view of the lower, anti-shimmy, friction washer 37.

Fig. 9 is a fragmentary, horizontal section through the wheel mounting, similar to Fig. 5 but with the fork 18 and steering collar 33 rotated to the point where said fork is just on the verge of being uncoupled from said steering collar.

Figure 1:
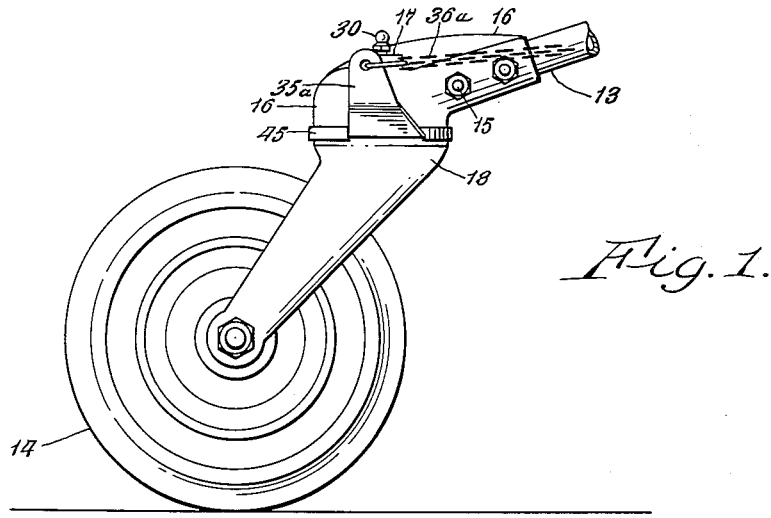
Fig. 1 is a diminutive side elevation of the present invention in its entirety.

Fig. 10 is a fragmentary, horizontal section through the wheel mounting, similar to Figs. 5 and 9, but with the fork 18 rotated further than in Fig. 9 so that it has automatically uncoupled itself from the steering collar 33 and hence is free to freely caster within the scope of its range of free castering movement.

Fig. 11 is a fragmentary, diminutive, top plan of the steering collar 33 together with its steering arms 35, 35a.

Fig. 12 is a perspective view of the uncoupling cam 56, showing its integral, semi-cylindrical boss 44 which restrains it against circumferential movement relatively to the bracket 16.

To reduce verbosity the following description covers the specific form of the invention here illustrated, but it is to be understood that this patent covers all equivalents which come within the scope of the claims which are appended hereto.

The numeral 13 indicates an upwardly and forwardly inclined fulcrum tube whose forward end is secured (by means not shown) to the fuselage of the airplane, as, for instance, to the rear end of a conventional airplane which has its tail wheel 14 located at the tail end of the plane. Secured by bolts 15 to the rear end of said fulcrum tube 13 is a bracket 16 whose main "hub" portion is substantially of inverted, cup-shaped form disposed normally on a substantially vertical axis. Secured to said bracket 16 by a shrink fit and depending coaxially therefrom is a spindle 17, and journaled on this bracket-spindle combination is the "hub" of fork 18. This journaling is effected by an upper, tapered, roller bearing 20 and a lower, tapered roller bearing 21. The outer race of the upper bearing 20 is lightly press-fitted into the bore 22 of the bracket 16, while the inner race of said upper bearing 20 is tightly press-fitted onto the upper, turned portion 23 of the fork 18. The proper vertical relationship of each individual fork relatively to its individual bracket (on a production basis) is effected by a metal adjustment washer 24 which is chosen by the assembler of such thickness as to effect the desired vertical relationship within the tolerances allowed. If the tapered rollers of the upper bearing 20 and/or the inner race of said upper bearing should become scored as a result of excessive loads roughly handled and insufficient lubrication, it may be desirable to replace them. But this is difficult, unless proper provision is made to meet this contingency, because of the fact that this inner race of said upper roller bearing 20 is a tight press-fit on the upper turned portion 23 of the fork 18. Such provision is made in the present invention by providing a pair of drift holes 25 (Figs. 4, 5, 9, and 10), whose upper ends open against the lower face of said inner race of said upper roller bearing 20 and thus, by the suitable use of drift pins, enable the mechanic to positively force said inner race of said upper bearing 20 off of the upper end of the turned portion 23 of the fork 18. The outer race of said upper roller bearing 20 is not difficult to remove because its bore 22 is shallow and its diameter sufficiently large as to operate satisfactorily when only a light press-fit is employed.

The lower, tapered roller bearing 21 carries very light loads and hence its outer and inner races need only be lightly press-fitted respectively into the bore 28 of the fork 18 and onto the lower end of the spindle 17. Adjustment of the upper and lower, tapered, roller bearings 20 and 21 is effected by the usual castled nut 26 which, after being adjusted, is prevented from rotating by the usual cotter key (not shown). To reduce the amount of dust and mud which might otherwise enter the lower, roller bearing 21, a metal-sheathed, felt-filled dust washer 27 is interposed between the lower end of the spindle 17 and the bore 28 of the fork 18, the metallic periphery of said dust washer 27 being lightly press-fitted into said bore 28.

Lubrication of the upper and lower, tapered roller bearings 20 and 21 is effected by a suitable grease fitting 30 which communicates with a suitably bored, grease duct 31.

It should be particularly noted at this point that these upper and lower roller bearings 20 and 21 definitely maintain a fixed vertical alignment of the fork 18 relatively to the bracket 16, irrespective of whatever loads may be imposed upon said fork and bracket. In this respect the present invention differs markedly from Patent 2,614,775, aforementioned.

Figure 2:
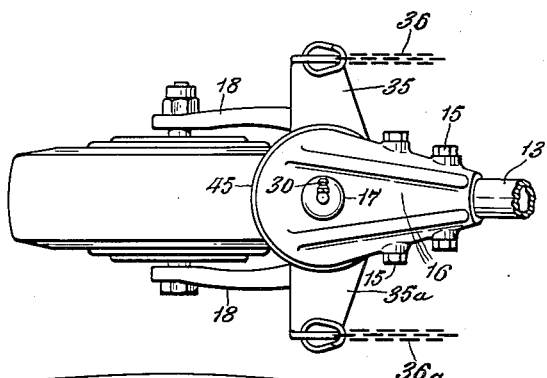
Fig. 2 is a diminutive top plan thereof.

Journaled on bearing 32 of the fork 18 is a vertically floatable steering collar 33 having at its lower end an outwardly extending flange 34 which, for convenience, has been shown in the drawings as integral with said steering collar 33, but which, for purposes of cost reduction, is preferably made in two separate parts suitably connected fixedly together. Integrally formed with said flange 34 is a pair of laterally extending steering arms 35 and 35a whose upturned distal ends (see Figs. 1 and 2) are connected in the conventional manner, through chains 36 and 36a, with the steering mechanism of the airplane. The steering-collar flange 34 rests upon a lower, anti-shimmy, friction washer 37 (see particularly Figs. 8 and 3) which is prevented from rotating, relatively to the fork 18, by the provision of a short, cylindrical pin 38.

Figure 3:
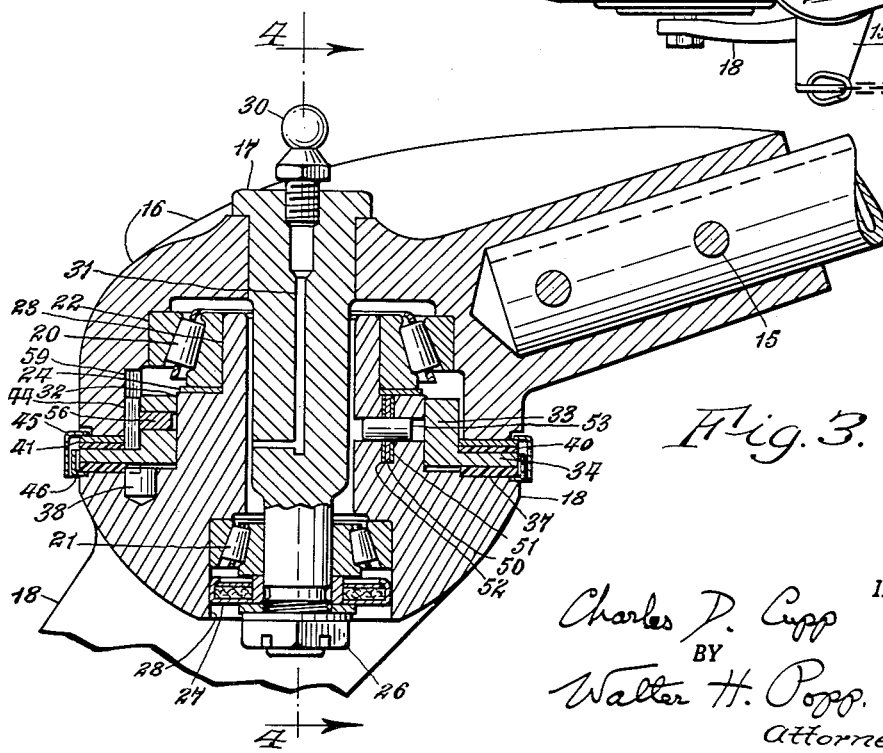
Fig. 3 is a fragmentary, longitudinal, medial section through the wheel mounting with the wheel 14 in its straight-ahead position as shown in Figs. 1 and 2.

It should be noted that this pin 38 is located at the rear end of the "hub" of the fork 18. The reason for this location of said pin is as follows: The only time said friction washer 37 is subjected to a heavy circumferential force is when the airplane is on the ground, and, at this time, the fork 18 tends to move clockwise (as seen in Fig. 3) relatively to the spindle 17 because the arms of the fork extend rearwardly. Therefore, even if the tapered roller bearings 20 and 21 have become very badly worn or have been too loosely adjusted, the maximum area of the pin 38 will be in contact with the lower friction washer 37 when the latter is subjected to such maximum circumferential strain.

Arranged upon the upper face of said steering-collar flange 34 is an upper, anti-shimmy, friction washer 40 (see Fig. 6) and on top of that a metal, pressure-distributing washer 41 (Fig. 7) and each of these washers has a semi-circular keyway (42, 43) both of which engage with a semi-cylindrical key 44 (to be subsequently described) so as to prevent their circumferential movement relatively to the bracket 16. Dust is prevented from entering the wheel mounting at this point by a pair of lower and upper, annular dust-excluding, overlapping, metal rings 45 and 46 which are L shaped in cross section and move circumferentially with the steering collar flange 34 and are suitably cut away, as shown in Fig. 4, to clear the steering arms 35, 35a of said steering collar flange 34.

The lower face of the bracket 16 is provided with an annular row of concentric, upwardly-bored holes 47, any number of which are adapted to receive compression springs 48. The outer diameters of these springs are slightly less than the diameters of the bored holes 47 so as to enable the springs to move vertically freely. These springs bear down on the metal, pressure-distributing washer 41 and this causes a vertical pressure to be exerted by the upper and lower, anti-shimmy washers 40 and 37 against the upper and lower faces of the flange 34 of the steering collar 33. Inasmuch as these two, anti-shimmy washers 40 and 37 are keyed, respectively, to the bracket 16 and fork 18, it follows that shimmy of said fork relatively to said bracket is eliminated if a sufficient number of springs 48 are provided.

Some airplanes need no compression spring 48 at all, whereas other airplanes may require one, two, three or more springs to obtain the desired amount of anti-shimmy drag. Preferably, of course, the springs are arranged symmetrically (six are shown in the drawings) so as to wear down the anti-shimmy washers 40 and 37 evenly, but this is not absolutely necessary, and any number of springs may be used and placed in any of the holes 47. Furthermore, the number of springs may be changed in the field by merely removing the castled nut 26, taking the wheel assembly apart and adding or subtracting the desired number of springs 48.

There is, of course, no need for making the flange 34 a part of this anti-shimmy mechanism, but its interposition permits of simplicity of design, and is therefore deemed advantageous.

The forward upper part of the fork 18 is transversely slotted to receive both the bight of a U-shaped spring 50 and also a pair of rectangular spacing plates 51 and 52. The thicknesses of these two plates are slightly different from each each other thereby enabling said spring 50 to be positioned in any one of four positions, i. e., with either the thin or the thick plate arranged in front, or with both in front or with both in back. This method of shop adjustment permits of generous manufacturing tolerances and yet permits of accurately locating the spring 50 relatively to the other parts with which it is associated. Said spring 50 and both of its spacing plates 51 and 52 are held in place by a pin 53 which is shorter than the hole which receives it so as to enable the metal at each end of said hole to be peened over after being placed in position so as to prevent the pin from becoming thereafter loosened and yet permitting it to be driven out if that should become necessary.

The opposite ends of this spring 50 constitute pawls which are adapted to engage, ratchet-fashion, with the V-shaped notches 54 and 55 that are formed in the hub of the steering collar 33. Thus, when the outer ends of said spring 50 are in engagement with said notches 54, 55, the fork 18 is rigidly secured to the steering collar 33, and the pilot thereby enabled to steer the wheel 14 irrespective of whatever lateral forces said wheel may be subjected to.

Fig. 12 illustrates the dual, uncoupling cam 56, shown detached from the rest of the wheel mounting, and having at its rear central part the integral, semi-cylindrical key 44 aforementioned. The front corners of this dual cam 56 are bevelled at 57 and 58 so as to uncouple the ends of the spring 50 from the notches 54, 55 as will be presently described.

Aforesaid integral, semi-cylindrical key 44 of the cam 56 is received within a semi-cylindrical keyway 59 formed vertically in the lower rear part of the bracket 16. Thus the cam 56 is definitely but detachably secured to said bracket 16.

The opposite ends of said cam 56 are slidably received within an annular, segmental slot 60 which is formed horizontally in the rear part of the steering collar 33, so that, when the fork 18 is moved from the position of Fig. 9 to some such position as that shown in Fig. 10 (resulting from the manual pushing around of the airplane), the bevelled face 57 or 58 (as the case may be) will uncouple the spring 50 from either the notch 54 or 55 (as the case may be) and thus uncouple the fork 18 from the steering collar 33. This enables said fork 18 and its wheel 14 to caster freely about the spindle 17, being uncoupled from both the steering collar 33 and its steering arms 35, 35a. However, when the pilot increases the speed of his engine or engines and moves forwardly, the wheel 14 will automatically swing the fork 18 around on the axis of the spindle 17 until it again becomes coupled to the steering collar 33, and the pilot then enabled to steer the wheel 14 in conjunction with his rudder in the usual and well known manner.

I claim:

1. An airplane wheel mounting comprising: a bracket connected with the fuselage of the airplane and having a hub arranged on a vertical axis; an annular row of vertical holes formed in said hub concentrically with respect to the axis thereof, the number of said holes being sufficiently great in number to take care of the maximum anti-shimmy needs of any airplane of the type for which the wheel mounting is suitable; a pressure-distributing, anti-shimmy plate arranged concentrically with respect to the axis of aforesaid hub; a plurality of anti-shimmy springs arranged against said pressure-distributing plate and arranged within none, or some, or all of said holes; a fork journaled on said bracket and having a wheel journaled thereon; and anti-shimmy, energy-absorbing means arranged between said plate and said fork.

2. An airplane wheel mounting comprising: a bracket connected with the airplane fuselage; a fork having a wheel journaled thereon and having an annular portion provided with a shoulder at its lower end; an anti-friction bearing interposed between said bracket and said fork, the inner race of said bearing being located on said annular portion; and a drift hole formed in said fork whereby a drift pin may be inserted so as to force aforesaid inner race off of its seat.

3. An airplane wheel mounting comprising: a bracket connected with the airplane fuselage; a fork having a wheel journaled thereon and having a slit; a spring member arranged in said slit and having its ends functioning as pawls; a pair of spacing shims of different thickness in said slit and arranged adjacent said spring member; and a rotatable steering collar journaled on said fork and having notches adapted to engage with the ends of said spring member.

4. An airplane wheel mounting comprising: a bracket connected with the airplane fuselage; a fork having a wheel journaled thereon and having a slit and a hole formed perpendicularly of said slit; a spring member arranged in said slit; a pin in the hole of said fork having a length smaller than the length of said hole so as to permit peening the ends of said hole; and a rotatable steering collar journaled on said fork and having notches adapted to engage with the ends of said spring member.

5. An airplane wheel mounting comprising: a bracket connected with the fuselage of the airplane; a rearwardly extending fork journaled thereon and having a wheel journaled on said fork; an anti-shimmy washer arranged in contact with said fork; a pin arranged in said fork and passing through the outer portion of said washer; and anti-shimmy means disposed between said washer and said bracket.

References Cited in the file of this patent
UNITED STATES PATENTS

| | | |
|---|---|---|
| 2,394,825 | Trader | Feb. 12, 1946 |
| 2,473,645 | Hollerith | June 21, 1949 |
| 2,544,278 | Nickell | Mar. 6, 1951 |